United States Patent [19]

Hashemi

[11] Patent Number: 5,491,787
[45] Date of Patent: Feb. 13, 1996

[54] FAULT TOLERANT DIGITAL COMPUTER SYSTEM HAVING TWO PROCESSORS WHICH PERIODICALLY ALTERNATE AS MASTER AND SLAVE

[75] Inventor: Seyed H. Hashemi, Mission Viejo, Calif.

[73] Assignee: Unisys Corporation, Blue Bell, Pa.

[21] Appl. No.: 296,302

[22] Filed: Aug. 25, 1994

[51] Int. Cl.⁶ .................................................. G06F 11/00
[52] U.S. Cl. ........................................................ 395/182.09
[58] Field of Search ................................. 395/575, 425; 371/68.1, 16.1, 9.1

[56] References Cited

U.S. PATENT DOCUMENTS

| | | | |
|---|---|---|---|
| 3,795,800 | 3/1974 | Nimmo. | |
| 4,358,823 | 11/1982 | McDonald et al. | 364/200 |
| 4,466,098 | 8/1984 | Southard | 371/9 |
| 4,610,013 | 10/1986 | Long et al. | 371/9 |
| 4,924,494 | 5/1990 | Shung | 379/100 |
| 5,325,517 | 6/1994 | Baker et al. | 395/575 |
| 5,398,329 | 3/1995 | Hirata et al. | 395/575 |

Primary Examiner—Hoa T. Nguyen
Assistant Examiner—Alan M. Fisch
Attorney, Agent, or Firm—Charles J. Fassbender; Mark T. Starr; Robert R. Axenfeld

[57] ABSTRACT

In a multiprocessor system, at least one processor is acting as a master processor and another processor is acting as the slave or shadow processor that checks operation of the first processor. Periodically, a controller switches operating mode of a master or main processor to slave or shadow mode, and at the same time switches operation of a slave or shadow processor to main or master processing mode. The first processor is then used as a slave or shadow processor to check operation of the second processor.

1 Claim, 6 Drawing Sheets

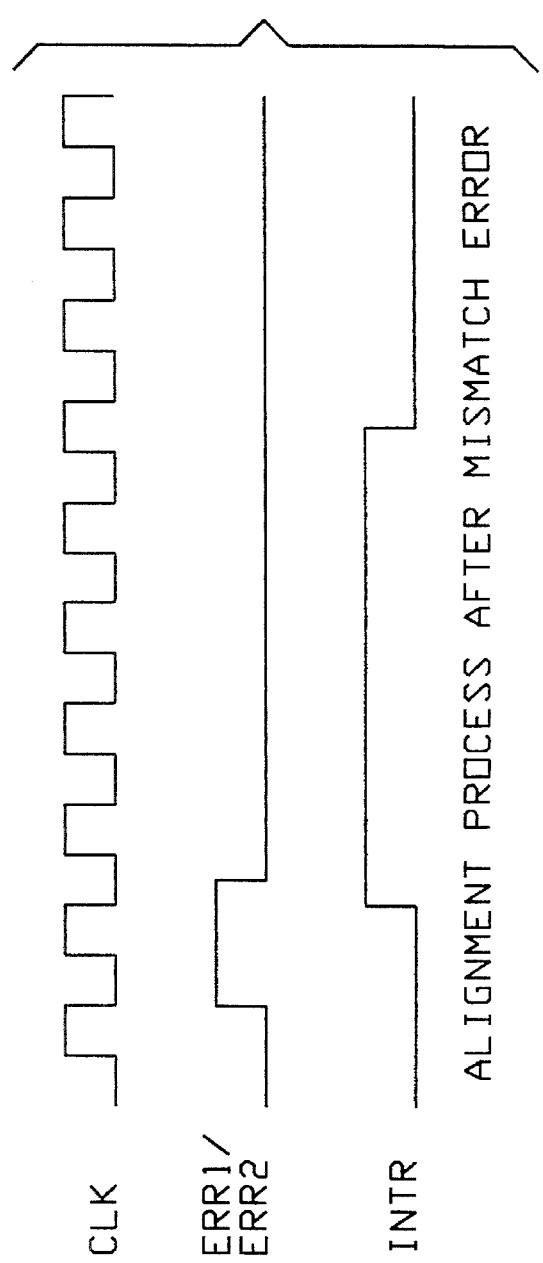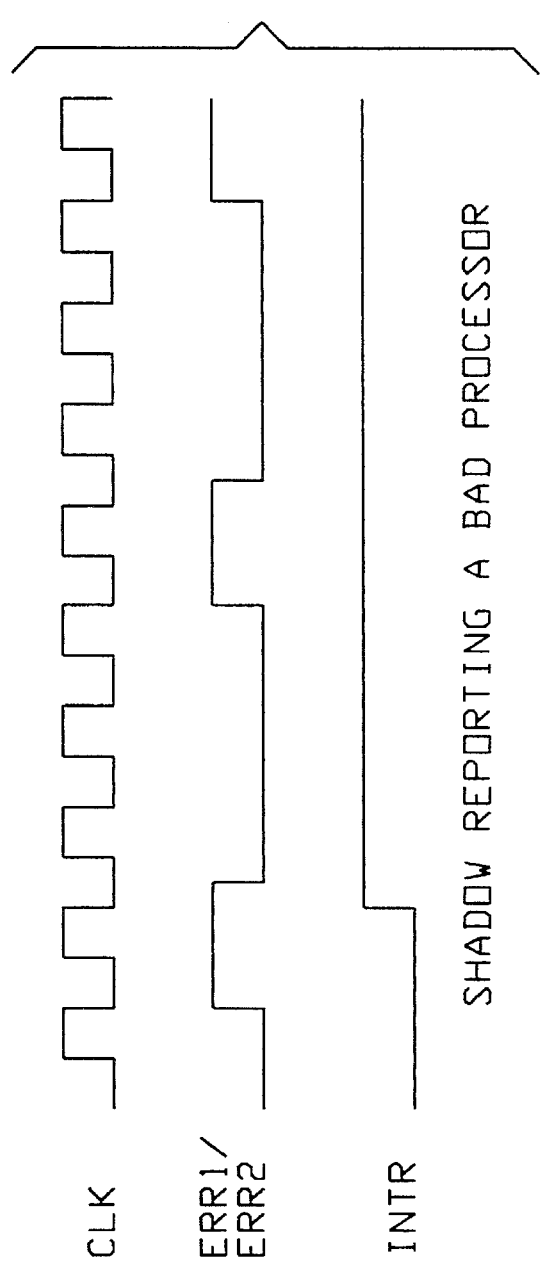

FAULT TOLERANT DIGITAL COMPUTER SYSTEM HAVING TWO PROCESSORS WHICH PERIODICALLY ALTERNATE AS MASTER AND SLAVE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates to fault tolerant digital computer system architecture especially with respect to ensuring proper processor operation. The present invention also relates to error detection/correction and fault detection/recovery. The present invention further relates to electrical computers and data processing systems, and more particularly to general purpose programmable digital computer systems utilizing an architecture with plural (redundant) processors and control of those processors.

System integrity, or the ability to detect incorrect system operation, is important in many areas of computer applications. Applications where human safety must be assured, such as air traffic control, aircraft control, or weapons guidance and control, are examples of systems in which errors in processing could have catastrophic effects. Other applications which have less severe consequences and yet operating integrity is highly desirable are banking and highly secure military classified computing and communications.

One method of ensuring system (or subsystem) integrity involves the checking of operation of a processor such as a central processing unit (CPU) or a local processor. In each such case where a redundant processor is used, the main and redundant processors are similarly connected to receive addresses, data, control signals and instructions. Thus, both such processors receive the same addresses, data, control signals, instructions and clock(s). One of these processors, sometimes referred to as the main processor or the master processor, provides normal processing, control, etc. such as may be needed for a particular application. The other processor, sometimes also referred to as a shadow processor or a slave processor, runs in parallel with the first processor and compares its own internal calculations with anything that the main processor sends out. To maintain synchronization between the two processors, they must operate with identical clocks. This can be accomplished by having one processor provide its clock signal to the other, or by driving the clock input(s) of both such processors with the same externally generated clock. In such a configuration, it may be desirable to give the shadow processor control over the system or subsystem when an error is isolated to the main or master processor. To maintain synchronization, it may be desirable to first halt operation of both processors, and then transfer control from one processor to the other. If the output from the main or master processor does not correspond with what is correspondingly generated internally by the slave or shadow processor, then an error is present in the system or subsystem. For fault detection purposes, the second processor is connected in parallel with the first processor, but the second processor has its outputs disabled such as by being placed in a test mode. The second processor, by comparing its outputs to the outputs of the first processor, extensively checks operation of the first processor. However, if the second processor is itself not operating properly, then faults with the first processor would not be detected. The present invention fulfills this need.

Slave or shadow processors are used in fault tolerant systems. In effect, the second processor is shadowing the operation of the first processor, and for that reason is sometimes referred to as a shadow processor. This can be accomplished in several ways, with the mode selected being dependent on the type of processors being used. For example, an external error compare circuit could be used to compare the outputs of the two processors. Other processors can shadow like processors within its own physical package without a need for external compare circuits. In the latter situation, such processors are placed in the shadow mode by activating an appropriate external pin. This causes the processor to tri-state, open-circuit or place a high impedance on its outputs. In shadow mode, the processor compares its internal output signal(s) to the corresponding external output(s) from the main processor, which is also provided to the shadow processor. Regardless of the mode used, if there is a mismatch between those signals, then a mismatch error should be indicated, by the shadow processor or by an external compare circuit. However, such a system assumes that the shadow processor is operating properly. If this is not the case, then an error in the first processor can go undetected. Furthermore, with a processor that is equipped with shadowing capability within itself, there is also a possibility that the shadow processor is working improperly or not working at all, and thus, there is no mismatch error generated. Furthermore, in a situation where it becomes necessary to transfer system or subsystem control from the first processor to the second processor, switching to a faulty or non-operating second processor could be catastrophic.

In a system or subsystem that includes a main processor and a shadow processor, the main processor performs all of the operations of some program, and the shadow processor just runs in parallel with the main processor and compares its own internal calculations with anything that the main processor sends out. Thus, the main processor and the shadow processor each receive the same instructions, data, etc., but only the output(s) of the main processor is actually used for its intended purpose by the system or subsystem it serves or where it resides. The shadow processor is utilized only for error or fault detection. For example, an identical program or set of instructions could be provided to both the main processor and the shadow processor, and both processors then execute those instructions. Both processors execute all of the instructions in that particular program. As a result of executing those instructions, the main processor eventually produces output(s) at its data output(s), and may also receive data and generate addresses. Meanwhile, the shadow processor is performing the same instructions, and so internally should be generating the same data results, but does not externally output that data. Thus, whenever a command in the program directs the processors to produce a data result, only the main processor will send that result out. That result is then received by the shadow processor, which compares that result to its own internally generated result of what the shadow processor would have sent out in response to that command. Alternatively, this comparison could be performed externally, but then care must be taken so that only the output of one processor at a time is provided to the system, subsystem or the like. If the system is operating properly, the results determined by the two processors should be equal or identical; otherwise, something is wrong with the system. The system may also include a data bus, address bus, instruction bus, etc., with the data bus for example being connected to other modules that produce or receive data to or from the main processor. For example, there could be a data memory, a data I/O module, etc. connected to the data bus. At any one instant in time, any of these could be putting out an address or data. In another instant, any of these could be receiving an address or data. The shadow processor, as its name implies, acts as a shadow, monitoring what is going on but not putting anything out on that bus or otherwise not being utilized by the system. Whenever the main processor puts something out on the bus, the shadow processor checks it against its own internal calculations. However, if the shadow processor is faulty or inoperative, then such checking likely could not be performed. In such a situation, the main processor is operating, and the user might believe that the shadow processor is checking such operation when in fact that checking is not being accomplished.

Thus, there is a need to perform in-line, real-time checking of a shadow processor. The present invention fulfills this need.

As used herein, the terms system and subsystem may be used interchangeably, and the terms slave processor and shadow processor may be used interchangeably.

SUMMARY OF THE INVENTION

Accordingly, an object of the present invention is to provide apparatus and method for checking for a malfunctioning or inoperative shadow or slave processor.

Another object of the present invention is to provide a fault-tolerant master/slave or main/shadow processor configuration.

A further object of the present invention is to provide a fault-tolerant system for processing, control, computing, etc.

Still another object of the present invention is to provide apparatus and method for switching operation or control from one processor to another.

Briefly, these and other objects of the present invention are accomplished by apparatus and method wherein two or more processors are connected in parallel to receive identical instructions, control signals, data, addresses, etc. involved with normal system operation. A controller is connected to each such processor to control which processor(s) are performing the usual computing operations or the like, and which processor(s) are instead being used for checking operation of the other processor(s). For example, one such processor could be utilized for operational purposes, and the other processor would be used for checking operation of the first processor for error or fault detection purposes. For example, a system could include only two such processors. The controller would then switch those two processors between normal and shadow operation, so that at different times each processor would be checking operation of the other processor. Such switching could be periodic (e.g. once every second), event-controlled, or both. In this manner, operation of both such processors could be checked and proper system operation could be thereby better assured. Should one of these processors while in shadow or checking mode find an error in the other such processor, then an appropriate error signal would be produced. Alternatively, the outputs of the two processors could be externally compared, and an error signal generated if there is a mismatch. If such an external error check is not provided, then after the controller switches the operating mode for the two processors, a timer can be provided so that absence of any signal from the first processor after a predetermined period of time would produce an error indication.

Other objects, advantages and novel features of the invention will become apparent from the following detailed description of the invention when considered in conjunction with the accompanying drawings.

BRIEF DESCRIPTION OF THE DRAWINGS

In the drawings,

FIG. 9 is another waveform timing diagram for signals that can be received or produced by the apparatus of FIG. 2 during another phase of operation of the apparatus of FIG. 2; and FIG. 10 is still another waveform timing diagram for signals that can be received or produced by the apparatus of FIG. 2 during still another phase of operation of the apparatus of FIG. 2.

DESCRIPTION OF THE PREFERRED EMBODIMENT

Figure 1:
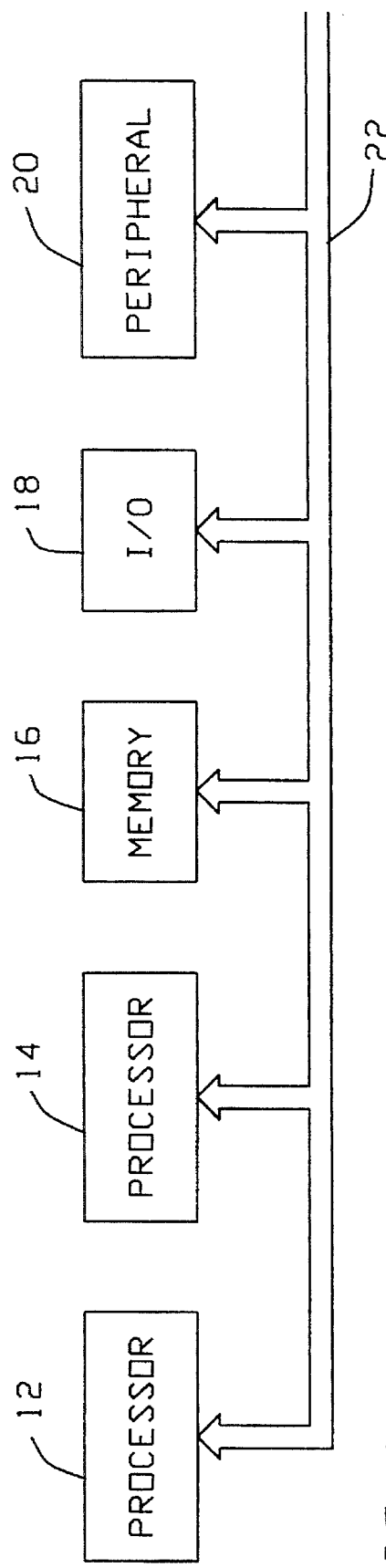
FIG. 1 is a simplified block diagram of a system including two processors.

Referring now to the drawings, wherein like reference characters designate like or corresponding parts throughout the several views, there is shown in FIG. 1 a processing system 10 including a first processor 12, a second processor 14, memory 16, input/output module 18, and peripheral 20, all interconnected by a common bus 22. Other modules can be connected to bus 22, or any or all of modules 16, 18 and 20 can be removed, within the practice of the present invention.

Figure 2:
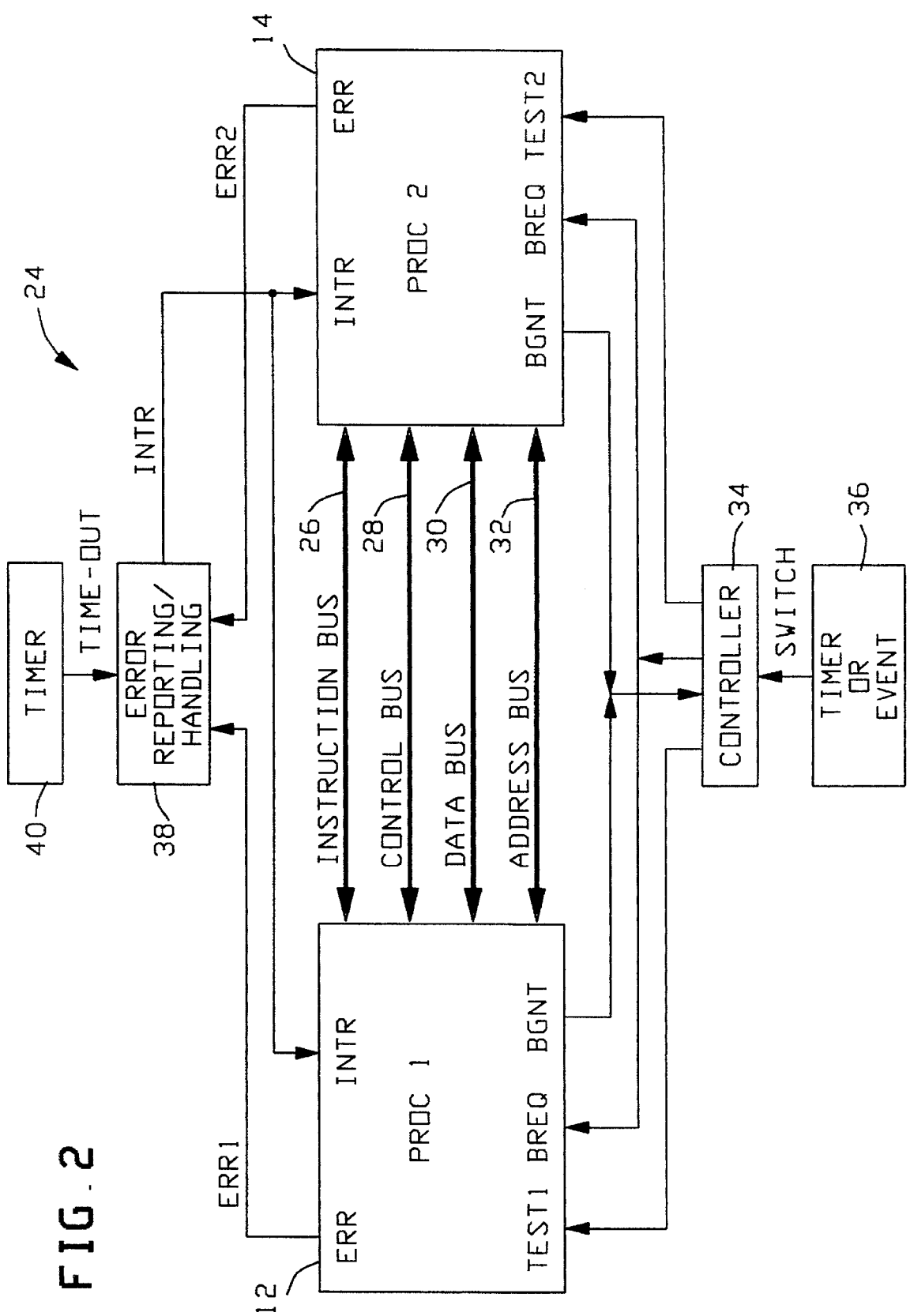
FIG. 2 is a block diagram of a two-processor system that accomplishes fault or error detection for both processors according to the present invention.

A portion of the system 10 of FIG. 1 is illustrated in FIG. 2 in greater detail. System 24 of FIG. 2 includes first processor 12 and second processor 14 receiving identical signals on instruction bus 26, control bus 28, data bus 30 and address bus 32. Controller 34 controls or sets or determines the mode of operation of processor 12 and processor 14, and in turn is controlled or activated by timer/event counter 36. Timer 36 provides a switching signal SWITCH at appropriate intervals or events to cause controller 34 to exchange the operating modes of processor 12 and processor 14. In response to the switching signal SWITCH, controller 34 stops or holds operation of processors 12 and 14 using the bus request signal BREQ. Processor 12 and processor 14 each respond to the bus request signal with the bus grant signal BGNT, which is then provided to controller 34. In response to the bus grant signal, controller 34 then changes the operating mode signal TEST1 which it provides to processor 12, and changes the operating mode signal TEST2 which it provides to processor 14. For example, if processor 12 is to normally be the main processor and processor 14 is to be the shadow processor for normal operation, then it is preferred that controller 34 switch the processor operating modes at regular intervals for a period of time shorter than those intervals but long enough to determine whether processor 14 is operating properly, as will be further discussed below. However, the duration of system 24 operation with switched operating modes should be short enough (e.g. 250 nanoseconds or five clock cycles) that overall operation of system 24 and of system 10 is not affected (assuming no fault is present). Because each processor would then be shadowing operation of the other processor, at different times, it is preferred that processor 12 and processor 14 be the same model processor. Although the following description applies to use of an Am29000™ or Am29005™ RISC microprocessor as processor 12 and as processor 14, it should be understood that the practice of the present invention is not limited thereto, and that the present invention can be practiced with other processors. The Am29000™ and Am29005™ 32-bit streamlined instruction processors are produced by Advanced Micro Devices, Inc. and are described in Am29000™ and Am29005™ RISC Microprocessors User's Manual and Data Sheet Rev. 1, 1993 produced by Advanced Micro Devices, Inc., 901 Thompson Place, P.O. Box 3453, Sunnyvale, Calif. 94008-3453.

As shown in FIG. 2, system 24 also includes error reporting/handling module 38, which would receive and respond to any error indication produced by processor 12 or processor 14. For the system of FIG. 2, such error signals would be produced by processor 12 or processor 14 as error signal ERR which would be provided to error reporting/handling module 38. If necessary, as discussed below, error reporting/handling module 38 would respond with a non-maskable interrupt signal INTR to both processor 12 and processor 14 to halt and restart their operation because of a detected fault condition. During a temporary switch of operating mode between processor 12 and processor 14 by controller 34, should not even a good signal appear on error line ERR1 from processor 12, which would then be functioning as the shadow processor, during a predetermined period set by timer 40, then timer 40 would provide a signal TIME-OUT to error reporting/handling module 38. The TIME-OUT signal would then cause module 38 to generate a non-maskable interrupt INTR because generation of the TIME-OUT signal would indicate that processor 14 is not functioning.

Processing system 24 includes two processors 12 and 14 as master and slave connected together in all but a few signals. System 24 also includes an error reporting and recovery unit 38 as well as a control unit 34 for master and slave operation (shadow controller). Control unit 34 indicates which one of the processors 12 or 14 is at any one time to be the master processor and which is then to be the slave processor. Control unit 34 also switches this configuration either by an external event or at specific time intervals, as determined by module 36. This switching operation causes the current master processor to become the future slave processor, and causes the current slave processor to become the future master processor, after each switching event by control unit 34. If the current slave processor is not functioning (dead processor), then as soon as the current slave processor becomes the future master processor, error reporting and recovery unit 38 will detect the fault. Thus, the maximum duration of an unrecovered error would be one switching time interval of module 36.

As shown in FIG. 2, the two processors 12 and 14 are connected to all buses (address bus 32, data bus 30, instruction bus 26 and control bus 28) and signals except for the test inputs and ERR outputs of those processors. For this example, it is assumed that processor 14 normally serves as the shadow processor. Controller 34 is connected to the test input of processor 12 and the test input of processor 14, as well as the BREQ (bus request) inputs and BGNT (bus grant) outputs of the two processors. At the same time, controller 34 is also receiving a switching input SWITCH from a timer/event counter 36. The error reporting/recovery unit 38 receives the ERR1 signal from processor 12, and the ERR2 signal from processor 14, as inputs, and generates an INTR non-maskable interrupt signal as output to the processors. Error reporting/handling module 38 also receives as an input a TIME-OUT signal from timer 40 (in effect serving as a gross timer or dead-man timer) to indicate time-out errors. As discussed above, for example the system 24 could start with processor 12 as the master processor and processor 14 as the slave processor. As the slave processor, if processor 14 detects a mismatch in the two processors' output(s), then processor 14 will provide an error signal ERR2 at its output ERR to the error reporting/recovery unit 38. The error recovery unit 38 first logs the error. Error recovery unit 38 then tries to put the two processors 12 and 14 back in synchronization by generating a non-maskable interrupt signal INTR which is provided to the respective NMI input of each processor. This interrupt causes the two processors 12 and 14 to restart at a specific, predetermined address and thus will be synchronized once again. This restart address can usually be hardwired within most processors.

Figure 4:
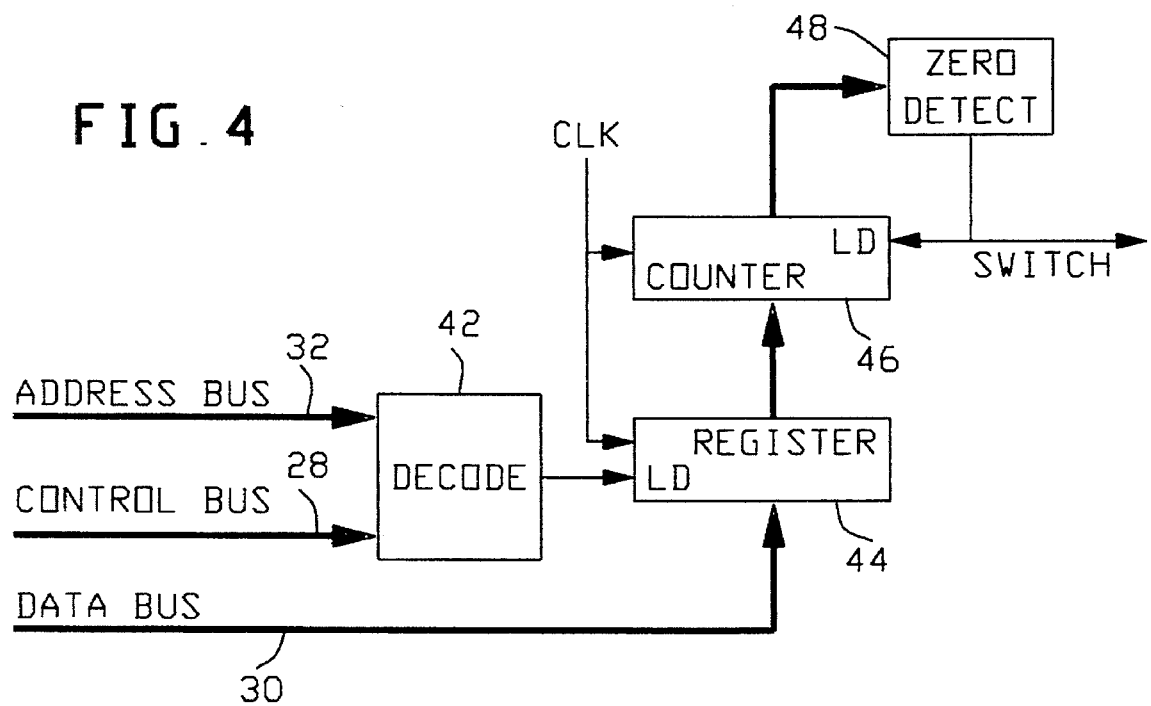
FIG. 4 is a block diagram of one embodiment of a timer or event counter that can be utilized to determine when the mode exchange by the controller of FIG. 2 can be accomplished.

FIG. 4 shows one example of a timer/event counter that can be utilized as timer/event counter 36 in FIG. 2. The timer/event counter of FIG. 4 includes a decoder 42 connected to address bus 32 and control bus 28, a register 44 connected to decoder 42 and data bus 30, a counter 46 connected to register 44, and a zero-value detector 48 connected to counter 46. Register 44 and counter 46 also receive a suitable clock signal, which is preferably the same clock signal that is used to clock processors 12 and 4. When triggered by a control signal provided by the master processor on control bus 28, decoder 42 decodes the address signal then on the address bus. If that address is a particular address preset for this purpose, then decoder 42 will provide an appropriate signal to the load or LD input of register 44. This causes register 44 to load the value then appearing on data bus 30. This value, which is also provided by the master processor, dictates the time between switching operating mode of the two processors 12 and 14 between master and slave. Register 44 and counter 46 each have a parallel load. The master processor initially loads a value (dictating the time between switching of the two processors 12 and 14) in the register. The decode logic 42 will act on the processors addressing register 44. Since at startup counter 46 would have a zero value, zero detector 48 will provide a load signal to the LD input of counter 46. Accordingly, the value now entered in register 44 is also loaded into counter 46. The clock signal CLK then causes counter 46 to count down. When the counter counts down to a zero value, the zero detect hardware 48 will activate the SWITCH signal, which is provided to controller 34. At the same time, zero detector 48 also causes counter 46 to reload the value in register 44 back into the counter. Thus, the interval between successive switch signals from timer/event counter 36 is held constant, unless the master processor changes the value held in register 44. The length of this interval is determined by the value placed in register 44 and the speed of the clock signal applied to register 44 and counter 46. Although a zero detector 48 is shown in FIG. 4, it should be understood that, within the practice of the present invention, counter 46 can be made to count up or down between any two predetermined values.

Figure 5:
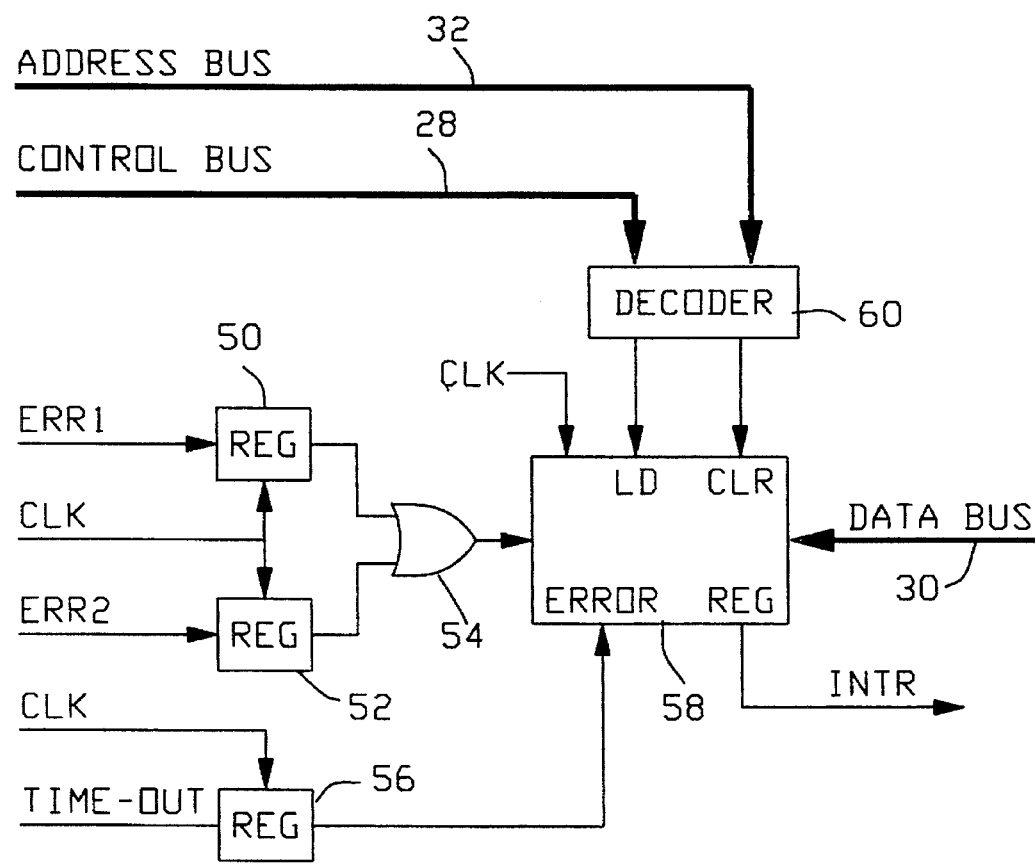
FIG. 5 is a block diagram of one embodiment of an error reporting/handling module that can be used in the system of FIG. 2.

One embodiment of an error reporting/handling module that could be utilized as error reporting/handling module 38 of FIG. 2 is shown in FIG. 5. The error reporting/handling module of FIG. 5 includes two registers 50 and 52 feeding an OR gate 54, a third register 56, an error register 58 receiving the outputs of OR gate 54 and register 56, and a decoder 60 for controlling operation of error register 58. Registers 50, 52, 56 and 58 have a common clock, preferably the clock used for processor 12 and processor 14. Register 50 receives and holds the ERR1 output of processor 12. Register 52 receives and holds the ERR2 output of processor 14. Register 56 receives and holds the TIME-OUT output of timer 40. OR gate 54 combines the registered ERR1 and ERR2 outputs into a single error signal which is provided as an input to error register 58. Register 56 provides the registered TIME-OUT signal as another input to error register 58. The master processor, via address bus 32 and control bus 28 as decoded by decoder 60, controls whether error register 58 will load the value being provided thereto onto data bus 30, or whether error register 58 would instead be cleared. An appropriate signal or value on control bus 28 from the master processor enables decoder 60 to decode the value on address bus 32. In the apparatus of FIG. 5, the two ERR1 and ERR2 signals are registered and combined together and saved into the error register. At the same time, if timer 40 produces a TIME-OUT signal, then the TIME-OUT signal is instead registered and saved into the error register. The master processor is able to read the error register 58 via data bus 30 and take proper action. The master processor would then clear error register 58 via address bus 32 and control bus 28 as decoded by decoder 60. If any of an ERR1 error, an ERR2 error or a TIME-OUT error occurs, then error register 58 generates an appropriate signal on its output INTR which is applied as a non-maskable interrupt to the NMI input of processors 12 and 14o This INTR signal would then activate the non-maskable interrupt of processors 12 and 14, which in turn resynchronizes processors 12 and 14 again. Thus, the apparatus of FIG. 5 is a self-locking mechanism.

Figure 6:
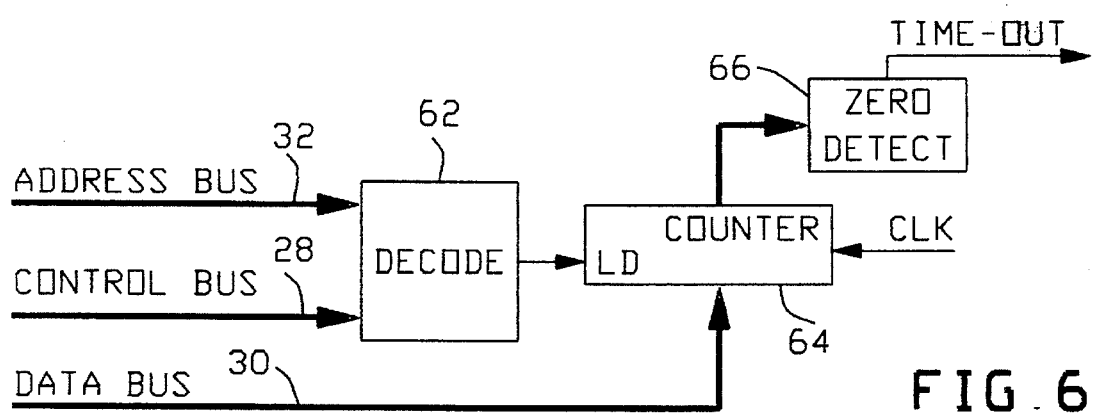
FIG. 6 is a block diagram of one embodiment of a timer that can be utilized with the error reporting/handling module of FIG. 5 in the system of FIG. 2.

One embodiment of timer 40 is shown in FIG. 6. The timer of FIG. 6 is similar to the timer/event counter of FIG. 4 except that the register 44 of FIG. 4 is not needed in the timer of FIG. 6. The timer of FIG. 6 includes a decoder 62, a counter 64 and a zero detector 66. The master processor 12 or 14 controls the timer of FIG. 6 via address bus 32 and control bus 28, which are provided as inputs to decoder 62. The output of decoder 62 in turn is applied to the load input LD of counter 64. Data bus 30 is connected to the data input of counter 64. Counter 64 is loaded every time that the master processor 12 or 14 writes a value to it. If the current master processor is hung and can not reload counter 64, then counter 64 reaches zero, and zero detect hardware 66 will then produce an appropriate TIME-OUT signal. The TIME-OUT signal is applied as an input to the error reporting/handling module. In FIG. 5, the TIME-OUT signal is applied to register 56. Thus, the timer of FIG. 6 ensures that the current master processor 12 or 14 is not dead. Control bus 28 controls decoder 62 by informing decoder 62 when it is to decode the address provided to the decoder by address bus 32. If the decoded value from address bus 32 is the value or values preselected for the purpose, then decoder 62 will activate the load input LD of counter 64, causing counter 64 to load what is then on data bus 30. This value in counter 64 is then counted down by the clock signal CLK. When the counter reaches a zero value, this is detected by zero detector 66 which in response generates the TIME-OUT signal. Thus, the value loaded into counter 64 determines the delay provided by the timer of FIG. 6. As discussed above, counter 64 could instead be set to count up or down between any two preset values for the same purpose.

Figure 7:
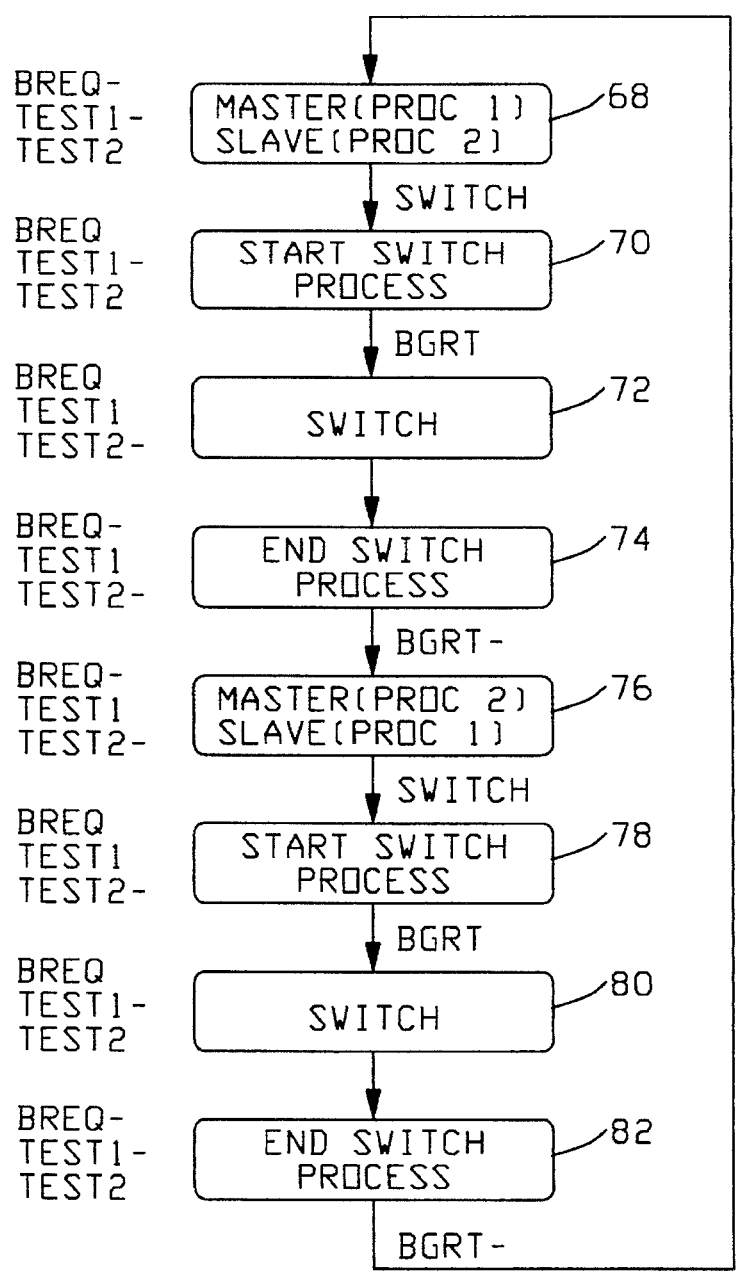
FIG. 7 is a flowchart illustrating a method of switching the two processors of FIG. 2 between master or operating mode and slave or checking mode.
Figure 8:
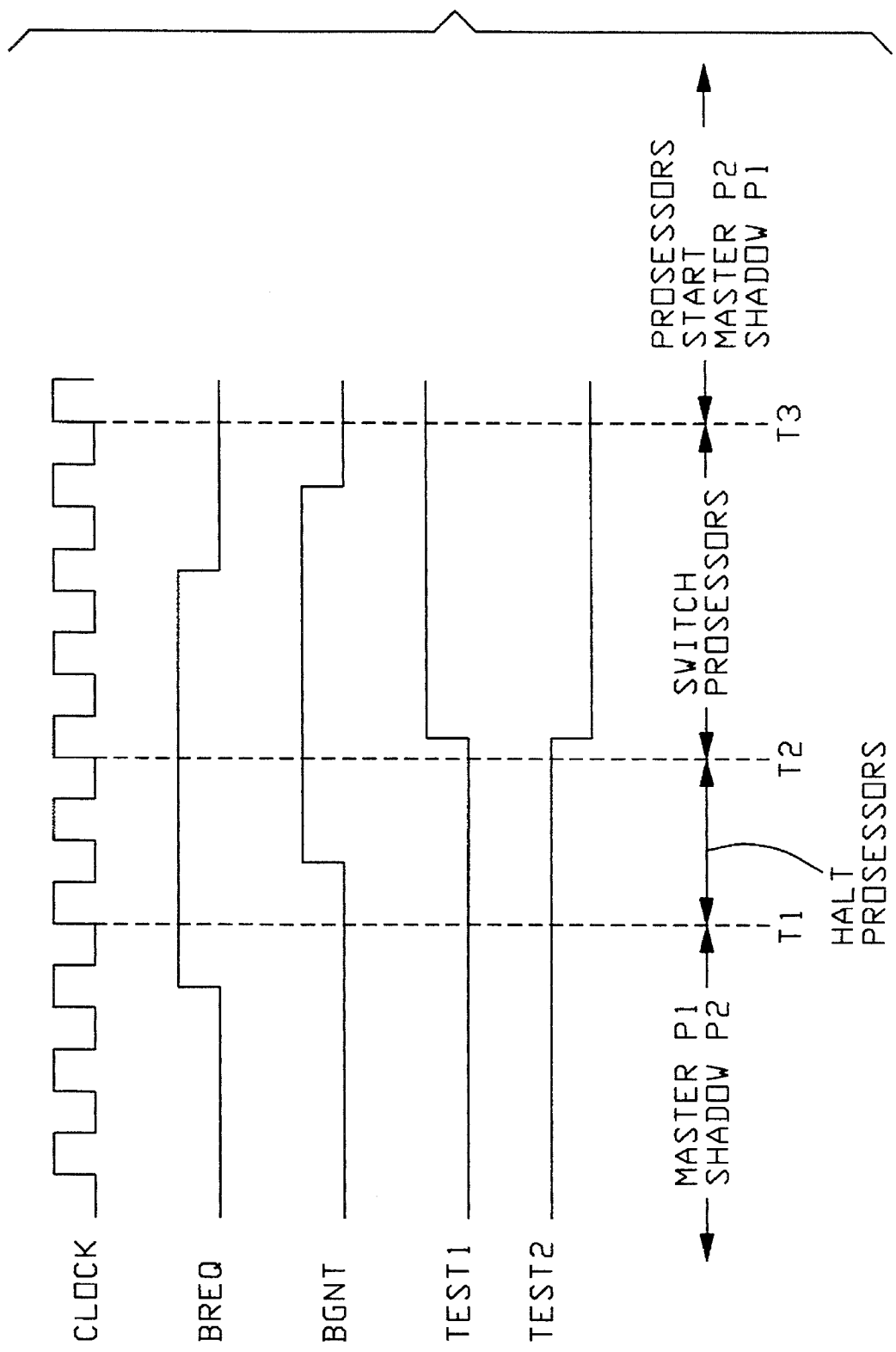
FIG. 8 is a waveform timing diagram for signals that can be received or produced by the apparatus of FIG. 2 during the operation of FIG. 7.

Every time that timer/event counter 36 produces signal SWITCH, controller 34 will start to switch the operating modes between the master processor and the slave processor. This process is illustrated in FIGS. 7 and 8. As shown in FIG. 7, this process starts at step 70 with controller 34 responding to the SWITCH signal by applying an active bus request signal to the BREQ input of processor 12 and the BREQ input of processor 14. This bus request signal will stop the flow of instructions as well as data transactions within a few clock cycles of processors 12 and 14. At this time, processors 12 and 14 release all of their buses 26, 28, 30 and 32 by tri-stating them. Processor 12 and processor 14 inform controller 34 of this action by each providing an appropriate bus grant signal BGRT from their respective BGNT outputs to controller 34. Upon being so informed, controller 34 at step 72 then switches the operating modes of the two processors 12 and 14 by changing the state of their respective TEST input. In other words, at step 72 the signal previously applied by controller 34 to the TEST1 input of processor 12 is now instead applied to the TEST2 input of processor 14, and vice versa. Controller 34 at step 74 then removes the bus request signal, and processors 12 and 14 start where they left off, but with reversed roles. In other words, if processor 12 was previously the master processor and processor 14 was previously the slave processor, then at step 74 processor 12 is now instead operating as the slave processor while processor 14 is then instead operating as the master processor. Steps 68 through 74 take only a few processor clock cycles, and can be repeated as often as needed. If the current slave processor is not functioning, then after the switch provided by steps 68 through 74 it becomes the new master processor. The new master processor will then either function with a mismatch which is signalled by the new slave processor immediately, or else cannot function at all which timer 40 will catch by an appropriate TIME-OUT signal after the preset waiting time expires. The maximum time that the system 24 can be exposed to a faulty shadow processor is thus the time between switching. After the roles of processors 12 and 14 have been reversed for a predetermined period, shadow controller 34 will then unreverse the processor 12 and 14 roles using steps 76 through 82, which respectively correspond to steps 68 through 74. With step 74, the bus request signal is no longer active. When timer/event counter 36 provides another SWITCH signal to controller 34, then at step 78 controller 34 applies a bus request signal to processor 12 and processor 14 as discussed above. When processors 12 and 14 respond with the bus grant signal, controller 34 again reverses the states of the TEST1 and TEST2 signals, so that processor 12 is again the master processor and processor 14 is again the slave processor. At step 82, the switch process ends with the removal or inactivation by controller 34 of the bus request signal, which is followed by removal or inactivation by processors 12 and 14 of their respective bus grant signals (step 68).

The method of FIG. 7 can be implemented in a programmed logic device (PLD), programmed logic array (PLA), state machine or the like. FIG. 7 is a flow diagram showing what setup inputs would cause such a device to move from one state to another. FIG. 7 shows the respective inputs that cause such state changes, what happens internally in response to each such input and how the signals produced by such a device would be affected. One such device that could be used for this purpose is a 22V10 PLD device. However, the present invention is not limited to use of a 22V10; any PLD, PLA or state machine could be used for this purpose. The Boolean statements or expressions that would be implemented in such a PLD or the like to provide controller 34 is given in Table 1 below and in the following pages. These statements are written in the ABEL language.

```
module SHADOW
    SHADOW    device   'b22v10';
    switch    PIN;
    bgnt      PIN;
    breq      PIN;
    test1     PIN;
    test2     PIN;
    q0        PIN;
    q1        PIN;
    q2        PIN;
    clk       PIN;
    H,L,X,Z,CK = 1,0,.X.,.Z.,.C.;
                            "STATE DEFINITIONS"
    shad_sw = [q2,q1,q0];
    M1_S2 = [ 0, 0, 0];     "MASTER PROC1 & SLAVE PROC2"
    S_SW1 = [ 0, 0, 1];     "START SWITCHING"
    SW1   = [ 0, 1, 0];     "SWITCH IN PROGRSS"
    E_SW1 = [ 0, 1, 1];     "END SWITCH"
    M2_S1 = [ 1 ,0, 0];     "MASTER PROC2 & SLAVE PROC1"
    S_SW2 = [ 1, 0, 1];     "START SWITCHING"
    SW2   = [ 1, 1, 0];     "SWITCH IN PROGRESS"
    E_SW2 = [ 1, 1, 1];     "END SWITCH"
    equations
    [q2,q1,q0].clk = clk;
                            "STATE MACHINE"
    STATE_DIAGRAM shad_sw;
    STATE M1_S2:
        if switch then S_SW1 with
            breq = 1;
            test1 = 0;
            test2 = 1;
        endwith;
        else M1_S2 with
            breq = 0;
            test1 = 0;
            test2 = 1;
        endwith;
    STATE S_SW1:
        if bgnt then SW1 with
            breq = 1;
            test1 = 1;
            test2 = 0;
        endwith;
        else S_SW1 with
            breq = 1;
            test1 = 0;
            test2 = 1;
        endwith;
    STATE SW1:
        goto E_SW1 with
            breq = 0;
            test1 = 1;
            test2 = 0;
        endwith;
    STATE E_SW1:
        if !bgnt then M2_S1 with
            breq = 0;
            test1 = 1;
            test2 = 0;
        endwith;
        else E_SW1 with
            breq = 0;
            test1 = 1;
            test2 = 0;
        endwith;
    STATE M2_S1:
        if switch then S_SW2 with
            breq = 1;
            test1 = 1;
            test2 = 0;
        endwith;
        else M2_S1 with
            breq = 0;
            test1 = 1;
            test2 = 0;
        endwith;
    STATE S_SW2:
        if bgnt then SW2 with
            breq = 1;
            test1 = 0;
            test2 = 1;
        endwith;
        else S_SW2 with
            breq = 1;
            test1 = 1;
            test2 = 0;
        endwith;
    STATE SW2:
        goto E_SW2 with
            breq = 0;
            test1 = 0;
            test2 = J;
        endwith;
    STATE E_SW2:
        if !bgnt then M1_S2 with
            breq = 0;
            test1 = 0;
            test2 = 1;
        endwith;
        else E_SW2 with
            breq = 0;
            test1 = 0;
            test2 = 1;
        endwith;
    end
```

In Table 1, all states have been identified as has been done in FIG. 7. The state machine of Table 1 can be programmed into a programmable device such as a 22V10 manufactured by a variety of integrated circuit vendors.

Alternatively, timer 36, error reporting/handling module 38 and timer 40 could also be implemented in programmable logic devices (PLDs), programmable logic arrays (PLAs), state machines or the like.

FIG. 8 is a waveform timing diagram showing signal changes during a switch or exchange of master processor and shadow processor roles or modes. Initially, starting from the left of FIG. 8, the initial master processor is identified as processor P1, and the initial shadow processor is identified as processor P2. To cause a switch in processor modes, both processors are then halted (here using the bus request signal BREQ which is responded to with the bus grant signal BGNT) at time T1. At subsequent time T2, after operation of both processors has been halted, controller 34 then proceeds to switch processor operating modes between master and shadow by changing signals TEST1 and TEST2. Thereafter, at time T3, system 24 begins operating again, with processor P2 now being the master processor and with processor P1 now being the shadow processor. The clock is preferably the common clock described above. Signal BGNT is provided by processors 12 and 14 to controller 34. Signals BREQ, TEST1 and TEST2 are provided by controller 34 to processors 12 and 14.

FIGS. 9 and 10 are waveform timing diagrams for when an error condition is detected. FIG. 9 shows the alignment or realignment process after a mismatch error is reported to module 38. FIG. 10 shows the shadow processor reporting a bad or dead master processor. FIG. 9 shows a signal sequence when an error is detected. During operation of system 24, if the shadow processor gets a result that does not correlate with the corresponding result provided by the master processor, then the shadow processor reports this error as signal ERR1 (from processor 12) or ERR2 (from processor 14) to error reporting/handling module 38. A non-maskable interrupt INTR is then generated to resynchronize processors 12 and 14. System 24 then tries to continue operating with the hope that the detected error was just a transient error or a temporary glitch. However, if immediately or shortly thereafter (such as is shown in FIG. 10) the error signal recurs, then a faulty or inoperative master processor is indicated.

In FIG. 10, presence of a faulty master processor is indicated by repeated presence of error indications or signals on signals or lines ERR1 or ERR2 every few clock cycles. If that occurs, then the command or level for a non-maskable interrupt will remain on output line or signal INTR for at least a relatively extended duration, at least longer than is shown in FIG. 9. If system 10 is configured to be operable without a shadow processor, then it would be preferred to turn off or deactivate the bad processor, and continue system operation with only the good processor(s) operating. This can be accomplished by inserting an AND gate on the SWITCH line from timer 36 to controller 34. This AND gate would then be controlled by what is normally a master processor, which could thereby remove signal SWITCH and disable controller 34. Alternatively, the master processor could disable controller 34 by loading register 44 with a large value. However, if an operative shadow processor is needed for system 10 operation, and no backup shadow processor is available in the system, then it would be preferred to shut down all or part of system 10.

Figure 3:
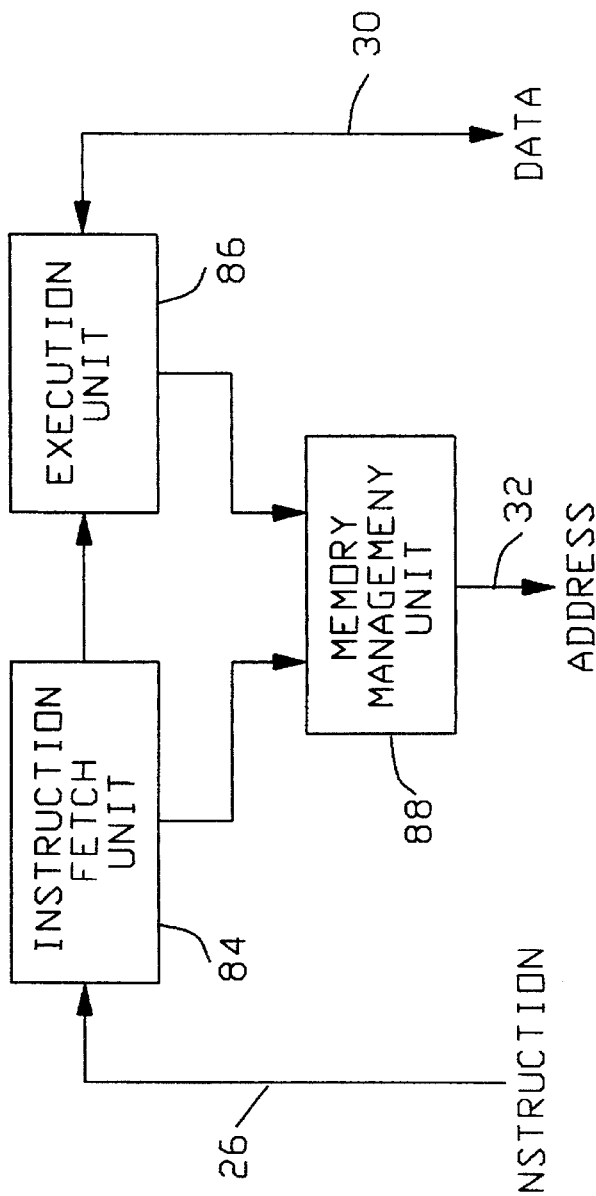
FIG. 3 is a block diagram of one embodiment of a processor that can be utilized in the present invention.

As discussed above, processor 12 and processor 14 can for example each be an Am29000/005 microprocessor. A simplified block diagram, adapted from FIG. 2—2 of the AMD manual cited above, is shown in FIG. 3. As shown in FIG. 3, each such processor includes an instruction fetch unit 84 receiving instructions from instruction bus 26, and an execution unit 86 receiving instructions from instruction fetch unit 84 and receiving or producing data on a separate data bus 30. The Am29000 microprocessor furthermore includes memory management unit 88 which produces address signals; otherwise, addresses would be sent to or produced by execution unit 86. For these AMD microprocessors, as described in the above-identified manual, bus request (input, synchronous) signal BREQ would correspond to signal BREQ described above, bus grant (output, synchronous) signal BGRT would correspond to signal BGNT described above, master/slave error (output, synchronous) signal MSERR corresponds to signals ERR1 and ERR2 described above, test mode (input, asynchronous) signal TEST corresponds to signals TEST1 and TEST2 described above, and warn (input, asynchronous, edge-sensitive) signal WARN corresponds to signal INTR described above. The bus request input allows other masters to arbitrate for control of the processor channel. The bus grant output signals to an external master that the processor is relinquishing control of the channel in response to the bus request signal. When the test mode input is active, the processor is in test mode, with all outputs and bi-directional lines, except MSERR, being forced to the high-impedance state or tri-state. The master/slave error output signal shows the result of the comparison of processor outputs with the signals provided internally to off-chip drivers of the slave processor. If there is a difference for any enabled such driver, then this line is asserted. A high-to-low transition on the WARN input causes a non-maskable trap or interrupt to occur.

However, as discussed above, the present invention is not limited to utilization of the Am29000/005 microprocessor. Instead, processors produced by Intel Corporation, Motorola Corporation, etc. running in parallel could be substituted therefor.

It is preferred that processor 12, processor 14, timer or event counter 36, controller 34, error reporting/handling module 38 and timer 40 all utilize a common clock.

The timer or event counter of FIG. 4 is a pre-loaded programmable timer, providing a repeated switching signal to switch processors 12 and 14 between master and slave modes and back. The frequency of such switching depends on the criticality of knowing promptly if the shadow processor is bad or malfunctioning. For example, a complete switching cycle between master and slave mode and back again could be done once every minute, or once every second, or each time that an input/output event occurs. Switching could occur with each I/O event for example if the master processor is calculating the physical location of received or produced data. Reading the wrong data from the wrong location, or storing data in the wrong location, are obviously not desirable. For some applications, even if the shadow processor 14 or 12 is not working, system 24 (and system 10) are not dead if the master processor 12 or 14 is still working. Knowing the status of the shadow processor immediately would then not be so critical, although reasonably prompt status information would be needed to avoid future problems. However, if for the particular application, proper operation of the shadow processor, to check the master processor, would be vital to maintaining system 24 integrity, then the frequency of switching processor modes should be increased appropriately.

Registers 44, 50, 52, 56 and 58 can for example each be a standard or ordinary register.

Some of the many advantages of the invention should now be readily apparent. For example, apparatus and method have now been provided for checking for a dead shadow processor, such as when an error is in the shadow processor so that it cannot check the master processor. Timer 36 periodically produces a switching or clock pulse, for example once every second or so, to controller 34, which in turn sends appropriate control signals to the two processors which put the main processor and the shadow processor in a hold state where they do not do anything, to maintain synchronization. Controller 34 then puts out other control signals which switch the main processor to shadow mode and the shadow processor to main processor mode. Controller 34 then instructs the two processors to start executing again. The main processor is now serving as the shadow processor, to check the processor that had, prior to this switch, been functioning as the shadow processor. If the former shadow processor is faulty or dead, and the main processor is operating properly, that situation could otherwise have continued indefinitely. However, with the operating mode exchange provided by the present invention, the main processor would now be able to detect faulty output of the shadow processor, which would then be reported to error reporting/handling module 38. A fault-tolerant master/slave or main/shadow configuration is thereby provided.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A method of operating a fault tolerant digital computer system of the type which includes first and second processors with each such processor having a) a standalone master operating mode and b) a slave mode for monitoring the other processor, said method comprising the steps of:

running said system in one state for a predetermined time interval where said first processor is in said master mode and said second processor is in said slave mode;

running said system in an opposite state for another predetermined time interval where said second processor is in said master mode and said first processor is in said slave mode; and, periodicly switching the operation of said system from said one state to said opposite state, and vice-versa, such that said first and second processors are in said master mode during respective time intervals which are interleaved.

* * * * *